J. C. DEUCHLER.
NUT LOCK.
APPLICATION FILED JUNE 1, 1920.

1,382,959.

Patented June 28, 1921.

Inventor
John C. Deuchler

By Joshua R H Potts
Attorney

UNITED STATES PATENT OFFICE.

JOHN C. DEUCHLER, OF TIFFIN, OHIO.

NUT-LOCK.

1,382,959.

Specification of Letters Patent.    Patented June 28, 1921.

Application filed June 1, 1920. Serial No. 385,554.

*To all whom it may concern:*

Be it known that I, JOHN C. DEUCHLER, a citizen of the United States, residing at Tiffin, county of Seneca, and State of Ohio, have invented certain new and useful Improvements in Nut-Locks, of which the following is a specification.

My invention relates to nut locks and particularly to that class thereof wherein the nut is locked to the bolt.

The object of my invention is to provide a nut lock which shall securely hold the nut in locked position on the bolt to the end that the same shall not become accidentally loosened or detached. A further object of my invention is to provide a nut lock as mentioned which may be readily released when desired. A further object of my invention is to provide a nut lock of simple construction and free from springs or other parts which might readily get out of order. Other objects will appear hereinafter.

With these objects in view my invention consists generally in providing the bolt with a longitudinal groove or grooves, and tapping a screw through the nut so that the inner end thereof may be engaged in one of said grooves after the nut is in proper position upon the bolt. My invention further consists in providing the said screw with a left-hand thread. My invention further consists in various details of construction and arrangements of parts, all as will be fully described hereinafter and particularly pointed out in the claims.

My invention will be more readily understood by reference to the accompanying drawings forming a part of this specification and in which—

Figure 1:
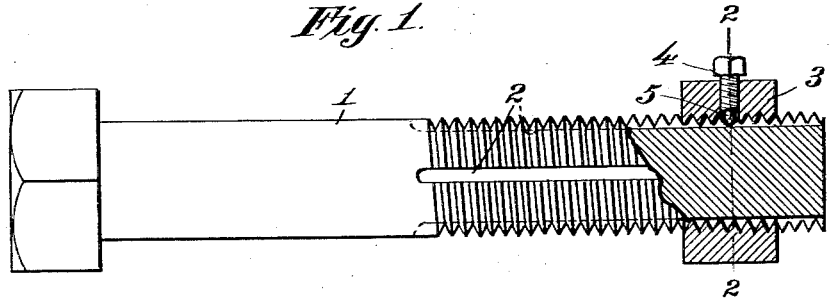
Figure 2:
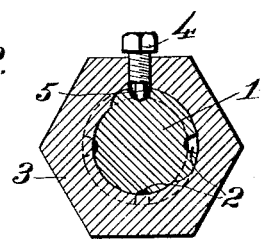

Figure 1 is an elevation of a bolt equipped with a nut lock embodying my invention, portions being illustrated in section, and, Fig. 2 is a transverse section on the line 2—2 of Fig. 1.

Referring now to the drawings 1 indicates a bolt of any ordinary or preferred form. The bolt is provided with a longitudinally disposed groove 2 extending from the threaded end any desired distance according to the use for which the bolt is designed. Preferably I provide the bolt with a plurality of such grooves and in the drawing I have illustrated four. 3 indicates the nut. Tapped through the nut is a screw 4, the inner end of which is adapted to be engaged within one of the grooves 2 after the nut is in desired position upon the bolt. Preferably the inner end of the screw is reduced in diameter and threadless, to the end that the grooves may be as narrow as possible and to prevent burring of the threads.

I have found that by having the threads of the screw 4 reversely arranged from those of the bolt, the screw will not become loosened by continued vibration. In the drawing I have illustrated the bolt with the usual right-hand thread and the screw 4 with a left-hand thread; but it is to be understood that if the bolt is provided with a left-hand thread the screw should be provided with a right-hand thread.

I claim:—

1. A bolt, a nut threaded thereon, and a reversely threaded screw tapped through said nut to engage said bolt, substantially as described.

2. A bolt provided with a longitudinally disposed groove, a nut threaded on said bolt and a reversely threaded screw tapped through said nut and adapted to engage within said groove, substantially as described.

In testimony whereof I have signed my name to this specification in the presence of two subscribing witnesses.

JOHN C. DEUCHLER.

Witnesses:
H. J. WELLER,
JOHN MCCAULEY.